United States Patent
Marascu et al.

(10) Patent No.: US 10,831,638 B2
(45) Date of Patent: Nov. 10, 2020

(54) AUTOMATED ANALYTICS FOR IMPROVING REUSE OF APPLICATION SOLUTIONS

(71) Applicant: INTERNATIONAL BUSINESS MACHINES CORPORATION, Armonk, NY (US)

(72) Inventors: Alice-Maria Marascu, Dublin (IE); Radu Marinescu, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 39 days.

(21) Appl. No.: 16/107,112

(22) Filed: Aug. 21, 2018

(65) Prior Publication Data
US 2020/0065225 A1  Feb. 27, 2020

(51) Int. Cl.
| | | |
|---|---|---|
| G06F 3/0484 | (2013.01) | |
| G06F 8/36 | (2018.01) | |
| G06F 11/34 | (2006.01) | |
| G06F 11/36 | (2006.01) | |
| G06F 9/30 | (2018.01) | |
| H04L 12/26 | (2006.01) | |
| G06F 17/11 | (2006.01) | |

(52) U.S. Cl.
CPC ........ *G06F 11/3616* (2013.01); *G06F 3/0484* (2013.01); *G06F 8/36* (2013.01); *G06F 9/30003* (2013.01); *G06F 11/3452* (2013.01); *G06F 17/11* (2013.01); *H04L 43/04* (2013.01); *G06F 2209/5011* (2013.01)

(58) Field of Classification Search
CPC ............ G06F 8/61–65; G06F 11/3616; G06F 3/0484; G06F 8/36; G06F 11/3452; G06F 17/11; G06F 2209/5011
See application file for complete search history.

(56) References Cited

U.S. PATENT DOCUMENTS

| | | | | |
|---|---|---|---|---|
| 5,159,687 | A * | 10/1992 | Richburg | G06F 8/36 706/45 |
| 5,539,862 | A * | 7/1996 | Short | G06F 8/36 706/45 |
| 6,847,981 | B2 | 1/2005 | Song et al. | |
| 2002/0083097 | A1 * | 6/2002 | Warrington | G06F 16/958 715/229 |
| 2003/0100972 | A1 * | 5/2003 | Andersh | G06F 8/36 700/121 |
| 2004/0031015 | A1 | 2/2004 | Ben-Romdhane et al. | |

(Continued)

OTHER PUBLICATIONS

Chanda et al., "SCAG: A Graphical Approach to Measure the Complexity of the SOA Application," ACM SIGSOFT Software Engineering Notes, vol. 36, No. 5, Sep. 2011 (6 pages).

(Continued)

*Primary Examiner* — Ziaul A Chowdhury
(74) *Attorney, Agent, or Firm* — Griffiths & Seaton PLLC

(57) ABSTRACT

A system and method for reusing application solutions for an application provider are presented. One or more proposed application solutions for a selected application may be monitored. A pool of previous application solutions may be accessed. A set of analytics may be determined for reusing components of one or more previous application solutions for the one or more proposed application solutions.

12 Claims, 10 Drawing Sheets

(56) References Cited

U.S. PATENT DOCUMENTS

| | | | | |
|---|---|---|---|---|
| 2005/0289538 | A1* | 12/2005 | Black-Ziegelbein | G06F 8/61 717/177 |
| 2006/0229994 | A1* | 10/2006 | Moulckers | G06F 8/34 705/59 |
| 2007/0299835 | A1 | 12/2007 | Takeuchi | |
| 2009/0210390 | A1* | 8/2009 | Lane | G06F 8/36 |
| 2009/0235353 | A1* | 9/2009 | Ammerlaan | G06F 8/60 726/22 |
| 2010/0031247 | A1* | 2/2010 | Arnold | G06F 8/61 717/174 |
| 2010/0205584 | A1 | 8/2010 | Jaeger et al. | |
| 2011/0231857 | A1* | 9/2011 | Zaroo | G06F 9/4881 718/104 |
| 2012/0331440 | A1* | 12/2012 | Meermeera | G06F 8/36 717/101 |
| 2013/0159326 | A1* | 6/2013 | Kyomasu | G06F 8/61 707/754 |
| 2014/0040862 | A1* | 2/2014 | Webster | G06F 8/61 717/121 |
| 2014/0052773 | A1* | 2/2014 | Deng | G06F 9/5072 709/203 |
| 2014/0282395 | A1* | 9/2014 | Wang | G06F 8/71 717/120 |
| 2015/0052483 | A1* | 2/2015 | Gire | G06F 3/04817 715/825 |
| 2016/0371352 | A1* | 12/2016 | Kohlmeier | G06F 16/9024 |
| 2018/0329693 | A1* | 11/2018 | Eksten | G06F 16/21 |

OTHER PUBLICATIONS

Fujii et al., "Dynamic Service Composition Using Semantic Information," ICSOC '04 Proceedings of the 2nd International Conference on Service Oriented Computing, Nov. 15-19, 2004 (10 pages).

Kumari et al., "A Composite Complexity Measure for Component-Based Systems," ACM SIGSOFT Software Engineering Notes, vol. 36, No. 6, Nov. 2011 (5 pages).

* cited by examiner

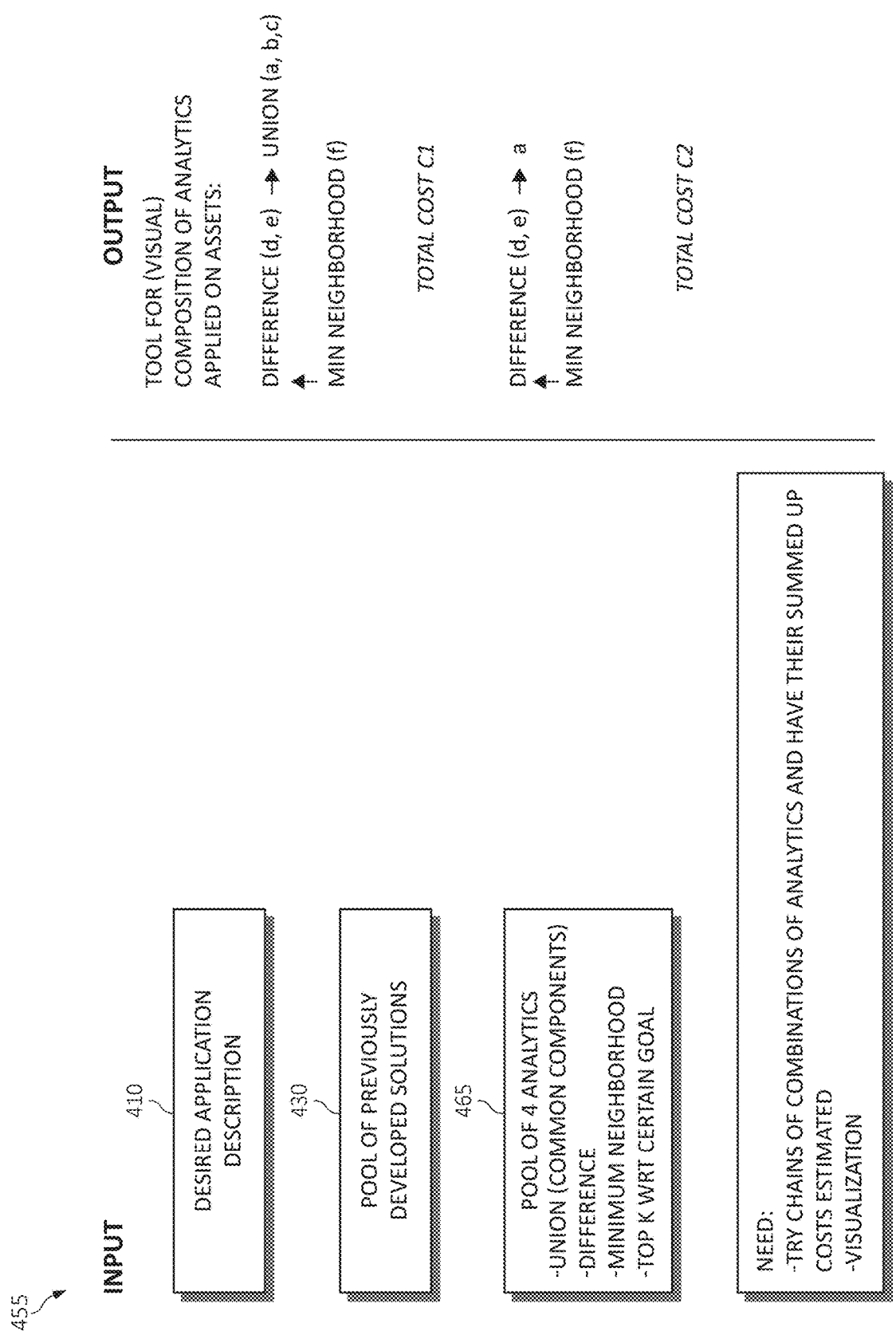

AUTOMATED ANALYTICS FOR IMPROVING REUSE OF APPLICATION SOLUTIONS

BACKGROUND OF THE INVENTION

Field of the Invention

The present invention relates in general to computing systems, and more particularly to, various embodiments for implementing automated analytics for improving the reuse of application solutions for application providers by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of applications and devices for personal, business, health, home, education, scientific, or governmental related areas of interest.

However, as software developers of these computing applications and devices strive to provide ever more versatile and powerful products, the task of becoming proficient in the implementation and development of such products becomes increasingly difficult. Even for some experienced software developers who consider themselves computer "experts," additional training and education may be required before the software developer provides the full advantage of functional capabilities intended to be offered by many software products.

SUMMARY OF THE INVENTION

Various embodiments for implementing automated analytics for improving the reuse of application solutions for application providers using one or more processors are provided. In one embodiment, by way of example only, a method for automated analytics for improving the reuse of application solutions for application providers, again by a processor, is provided. One or more proposed application solutions for a selected application may be monitored. A pool of previous application solutions may be accessed. A set of analytics may be determined for reusing components of one or more previous application solutions for the one or more proposed application solutions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4E is a block diagram depicting an operation for determining a composition of analytics for reusing components according to various aspects of the present invention;

DETAILED DESCRIPTION OF THE DRAWINGS

Figure 1:
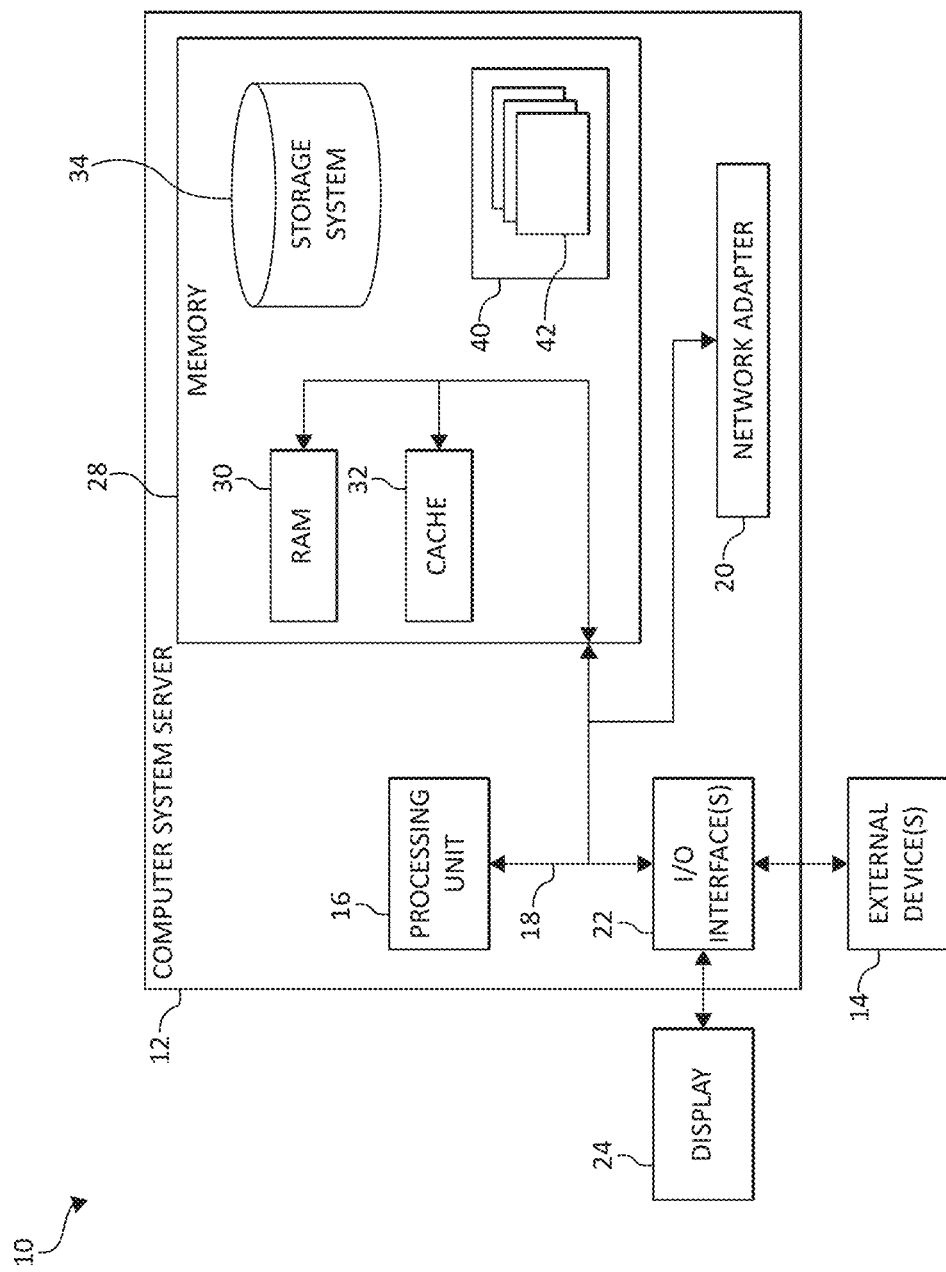
FIG. 1 is a block diagram depicting an exemplary computing node according to an embodiment of the present invention.

Current application development systems rely heavily on human involvement, especially during early phases of application development. Humans (e.g., application developers or "software developers") are needed to understand the problem description the application is asked to solve and, further, to manually design and create the desired application. This can create a bottleneck in application development, as well suboptimal results, given the large number of applications desired in modern society and the numerous potential combinations for each application.

Moreover, in today's environment, the demand for new applications is increasing while the time to deliver these new applications is decreasing. This causes the development and work of application developers or consultants to become more challenging. These application developers must be adept at learning new asset features and functionalities, which is a particular challenge for more inexperienced application developers. As the number and complexity of existing solutions increase, it becomes difficult and almost impossible to determine the appropriate and optimal way for re-usage of existing software components (e.g., intersections, differences, minimum neighborhood, etc.). Thus, the present invention provides an automatic solution for analytics for improving the reuse of components and/or graphs of components for application providers.

Accordingly, various embodiments are provided herein for implementing automated analytics for improving the reuse of application solutions for application providers in a computing environment. One or more proposed application solutions for a selected application may be monitored. A pool of previous application solutions may be accessed. A set of analytics may be determined for reusing components of one or more previous application solutions for the one or more proposed application solutions.

It should be noted, as a preliminary matter, that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
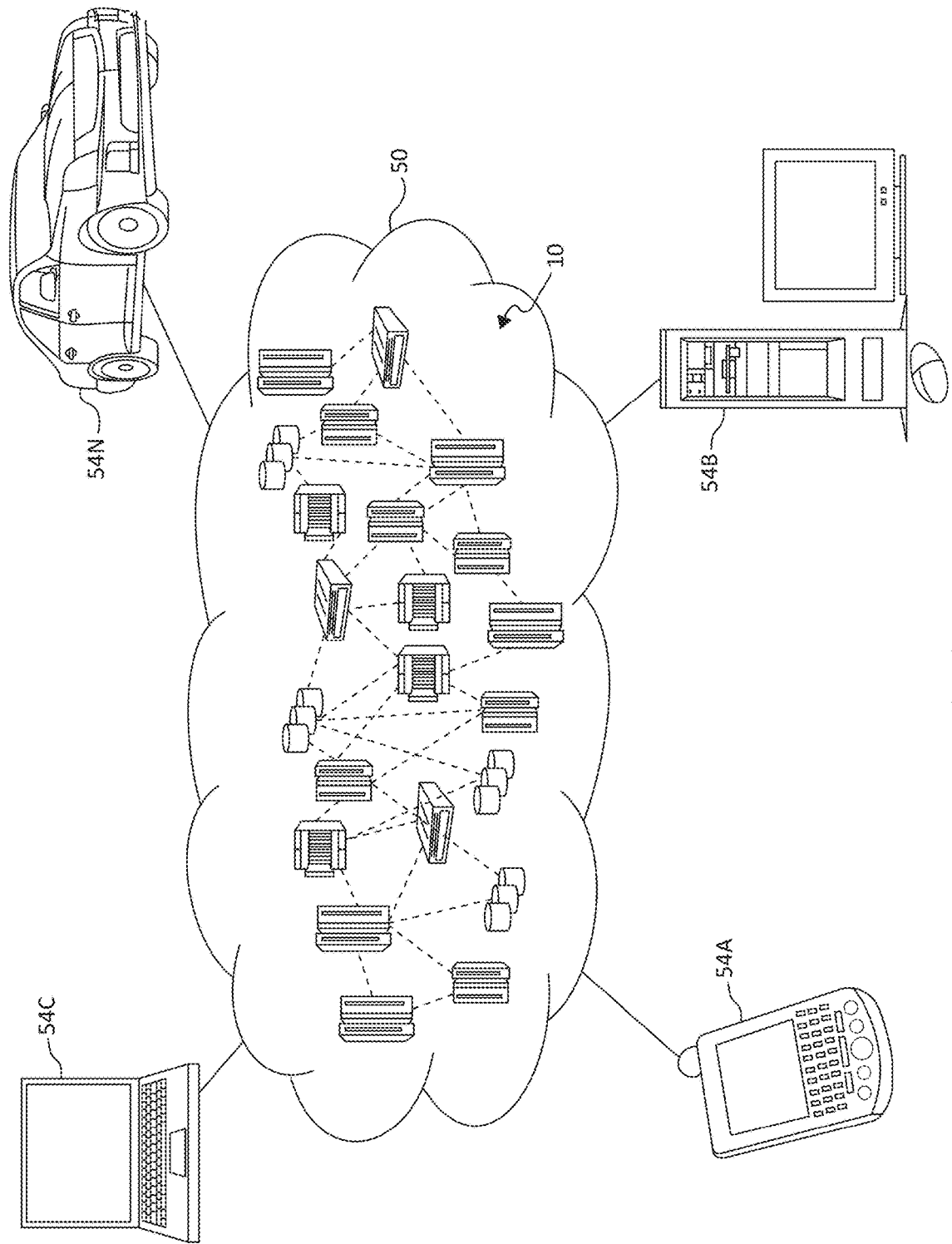
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
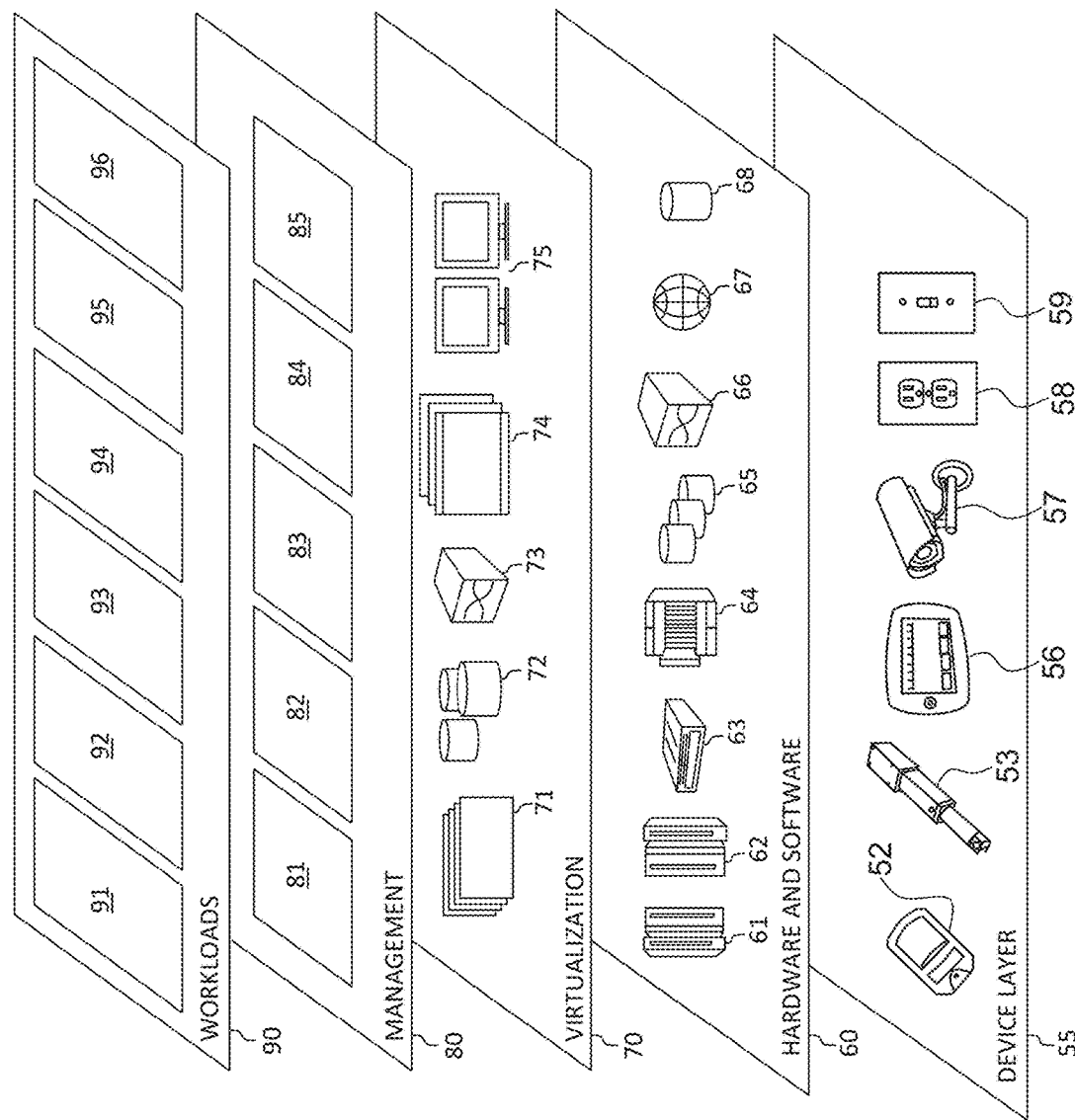
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automated analytics for improving the reuse of application solutions for application providers. In addition, workloads and functions 96 for automated analytics for improving the reuse of application solutions for application providers may include such operations as data analytics, data analysis, and as will be further described, notification functionality. One of ordinary skill in the art will appreciate that the workloads and functions 96 for automated analytics for improving the reuse of application solutions for application providers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for implementing automated analytics for improving the reuse of components and graphs of components for application providers. In one embodiment, a one or more solutions proposed by an application provider for a desired application may be monitored. A pool of previous application solutions may be accessed. A top k number of most similar application solutions may be retrieved by checking the similarity between the projects descriptions (e.g., same domain ("energy for cars")), and/or components descriptions (e.g., clustering for text). A set of analytics may be determine for reusing components of one or more previous application solutions for the one or more proposed application solutions. The set of analytics may include 1) determining common/similar graphs of components between either a desired application solution and an existing application solution, and/or between the desired application solution and multiple existing application solution, 2) determining the top-k common components for targeting a future defined goal, 3) determining the difference between graphs of components for re-use purpose, 4) determining the minimum graph neighborhood, and/or 5) determining the complex analytics combining the operations of 1-4 analytics Turning now to FIGS. 4A-4D are block diagrams for determining a set of analytics for improving the reuse of components and graphs of components for application providers. As will be seen, many of the functional blocks may also be considered "modules" of functionality, in the same descriptive sense as has been previously described in FIGS. 1-3. Many of the functional blocks 400 may execute as background processes on various components, either in distributed computing components, or on the user device, or elsewhere, and generally unaware to the user performing generalized tasks of the present invention. Also, one or more aspects of FIGS. 1-3 may also be included with and/or implemented with FIG. 4.

As depicted in both FIGS. 4A-4E are block diagrams 400, 425, 435, 445, and 455 that illustrate one or more determining a set of analytics for optimizing the reuse of components and graphs of components for application providers. For example, an application provider (e.g., a domain expert) may input a desired application description, as in block 410. A pool of previous existing solutions 430 (e.g., best or optimal solutions) may be accessed and provided by the application provider or computing system (e.g., application 1 ("app 1"), application 2 ("app 2"), application 2 ("app 2"), and/or application 3 ("app 3"), and/or application n ("app n")), as in block 420.

Figure 4A:
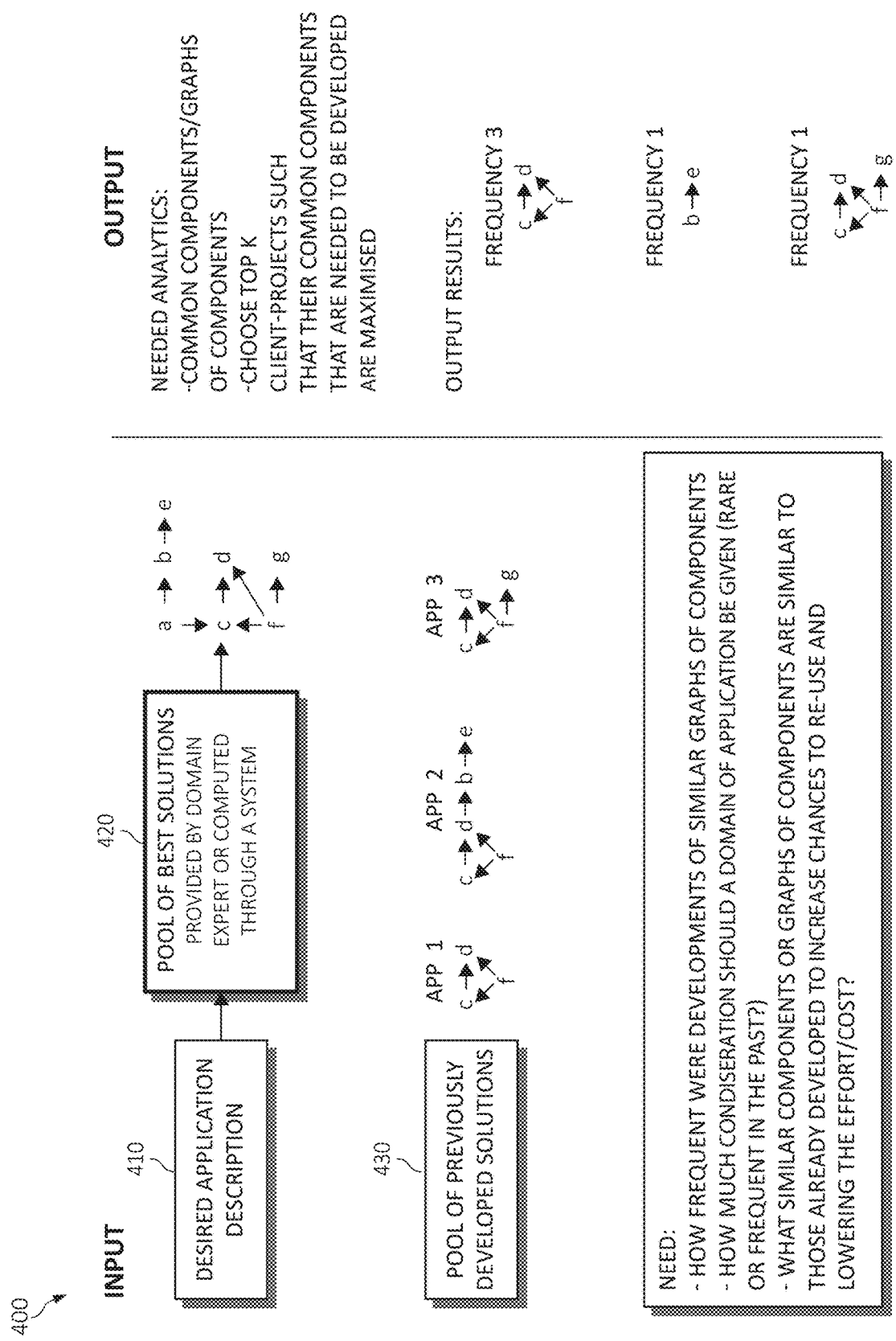
FIG. 4A is a block diagram depicting an operation for determining one or more similar graphs of components according to various aspects of the present invention.

As depicted in FIG. 4A, an operation may be performed for determining one or more similar components or graphs of components (e.g., components a, b, c, d, e, f, and g). As part of the determining operation, the operation may include determining how frequent were developments of similar graphs of components, a historical frequency (e.g., how frequent) or rarity (e.g. how rare) is the domain of the application, or components or graphs of components of a proposed application that are common and/or similar to those components or graphs of components that are currently developed (e.g., what components or graphs of components are similar to those already developed to increase changes for re-use and reduction in effort/cost). In this way, the analytics provide increased efficiency and opportunities for the reuse of components and graphs of components for application providers.

As output, the determination operation may provide the analytics that include, for example, one or more common/similar components. Also, in case a certain number of projects (e.g. k projects) are prioritized from a re-usage point of view based on historical positive performance indicators (e.g., high cost, high quality, sound components), a top k number of client-projects may be selected such that the common/similar components that are needing to be developed may be maximized, where "k" is a positive integer or defined value. In other words, the top k number of client-projects share the maximum number of common components.

In one aspect, to determine the union or to find frequent and/or similar subgraphs, an application graph G and a set of previously developed application graphs {G1, . . . , Gk} may be collected and used as input for the determination operation. The output or result of the determination operation may be a ranked list of most frequent common subgraphs between G and {G1, . . . , Gk}, as further illustrated in the following pseudocode:
Initialize C={ }
For i=1 to k:
compute graph intersection G and Gi as the set {C1, . . . , Cm} of maximal common subgraphs; compute C=C U {C1, . . . , Cm}.
For each distinct $C_i$ in C, let count_i be the number of times $C_i$ is in C,
Output: a sorted list {(Ci, count_i)|Ci is unique element in C.

For example, in relation to app 1, app 2, and app 3, the similar components or graphs of components between c, d, and f have a frequency of use of at least 3. The similar components or graphs of components between b and e have a frequency of use of 1. The similar components or graphs of components of c, d, and f with component g have a frequency of use of 1.

Figure 4B:
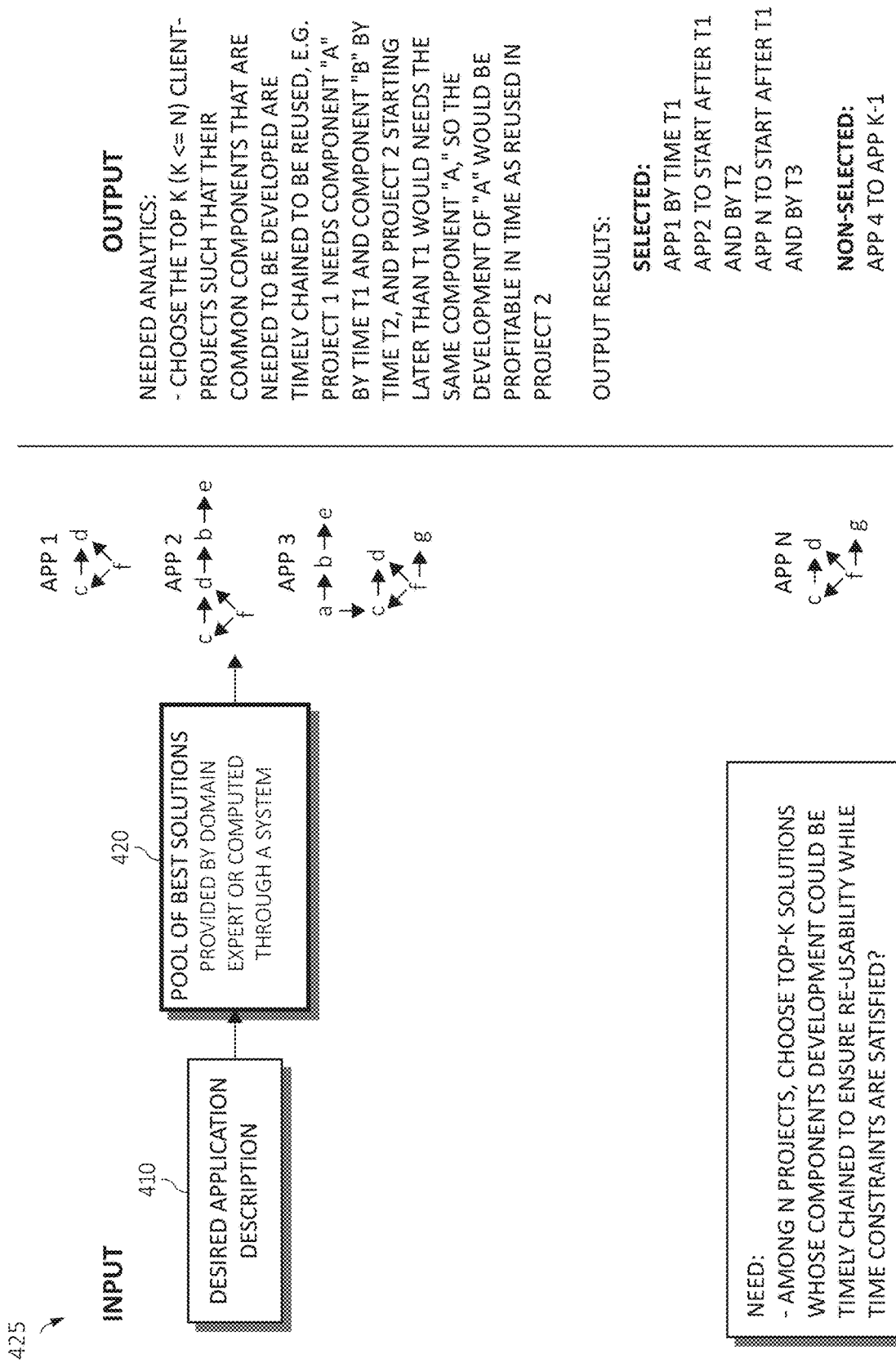
FIG. 4B is a block diagram depicting an operation for determining K number of ranked similar graphs of components according to various aspects of the present invention.

As depicted in FIG. 4B, an operation may be performed for determining the k number of ranked similar graphs of components or satisfying a defined goal. As part of the determining operation, the operation may include selecting the top k number of client-projects among an n number of projects whose component development may be timely chained (meaning that the development of some components is needed to be performed before the development of other components, as there are dependences between the data and/or operations between them) to ensure increased efficient or to maximize re-usability while simultaneously satisfying one or more time constraints, where "k" and "n" are positive integers and/or defined values.

As output, the determination operation may provide the analytics that may include, for example, choosing the top k (k<=n) client-projects such that the top k client-projects' common components that are needed to be developed are timely chained to be reused (e.g., project 1 needs components A by time "T1" and component B by time "T2", and project 2 starting later than "T1" who needs the same component A, so the development of A would be profitable in time as reused in project 2). Thus, the output may be app 1 to be completed by T1, app 2 to start after T1 and by T2, and app n to start after T1 and by T3. App 4 would not be selected.

In one aspect, to determine the k number of ranked similar graphs of components a set of (desired) application graphs {G1, . . . , Gn}, time requirements and time constraints at component level for developing each application, a desired goal, and the value of k may be collected and used as input for the determination operation. The output or result of the determination operation may be a subset of application graphs {G1, . . . , Gk} such that the most common subgraphs can be chained together in time to achieve the goal, as further illustrated in the following pseudocode:

Let A=2^{G1, . . . , Gn} be the power set of {G1, . . . , GN}(e.g., a set of all subsets of {G1, . . . , Gn};
For each subset B of A such that |B|=k (subsets of size k);
Let B={G1, . . . , Gk} and C=intersection(G1, . . . , Gk);
If C={ } then continue, else if C satisfies the input time requirements, time constraints and goal, then return C, else continue;
Return { } // if no solution was found.

Figure 4C:
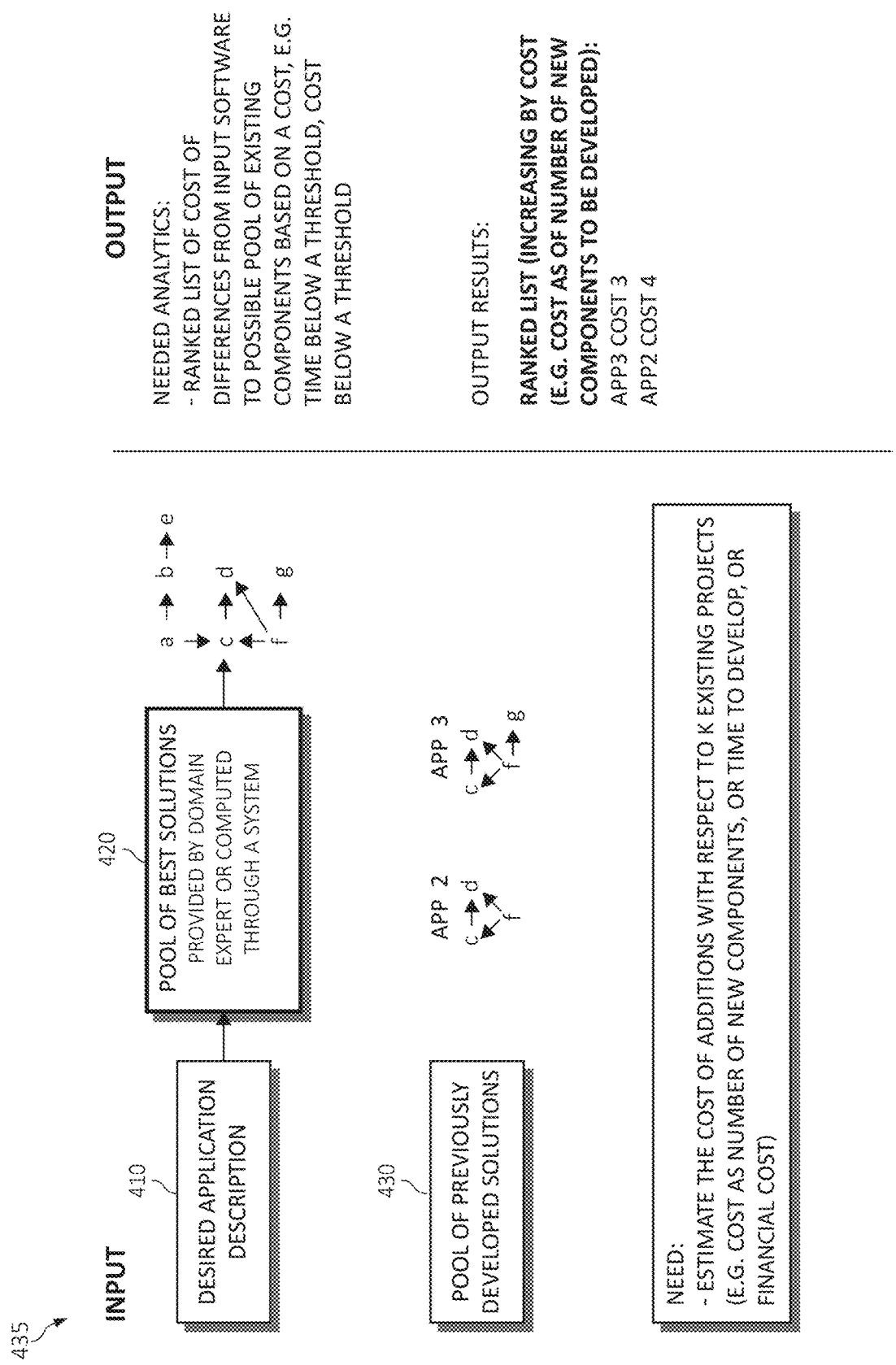
FIG. 4C is a block diagram depicting an operation for determining one or more selected differences between graphs of components according to various aspects of the present invention.

As depicted in FIG. 4C, an operation may be performed for determining one or more selected differences between graphs of components. As part of the determining operation, the operation may include estimating a cost (e.g., time cost, financial cost, resources cost, etc.) of component additions with respect to k existing projects such as, for example, a cost as to the number of new components, the required time to develop the projects, and/or the financial cost of the development.

As output, the determination operation may provide the analytics that may include, for example, a ranked list of cost of differences from input or the desired application solution to possible pool of existing components of application solutions based on a cost (e.g., a time below/above a threshold, cost below a threshold, etc.). The ranked list may be output as increasing by cost such as, the cost being a number of new components to be developed and the ranked list being 1) App3 cost 3 and/or 2) App2 cost 4.

For example, to determine one or more selected differences between graphs of components "a," an application graph and a set of previously developed application graphs {G1, . . . , Gk}, a cost function $c(G_i, G)$ (e.g., a number of new components to be added so that $G_i$ becomes G) may be collected and used as input for the determination operation. The output or result of the determination operation may be a sorted list {G1, . . . , Gk} by the cost function $c(G_i,G)$, as further illustrated in the following pseudocode:
Let C={ }
For each element Gi in {G1, . . . , Gk}:
Evaluate $c(G_i,G)$ and add (Gi, $c(G_i,G)$) to C;
Sort C in increasing order of c(Gi,G);
Return C.

Figure 4D:
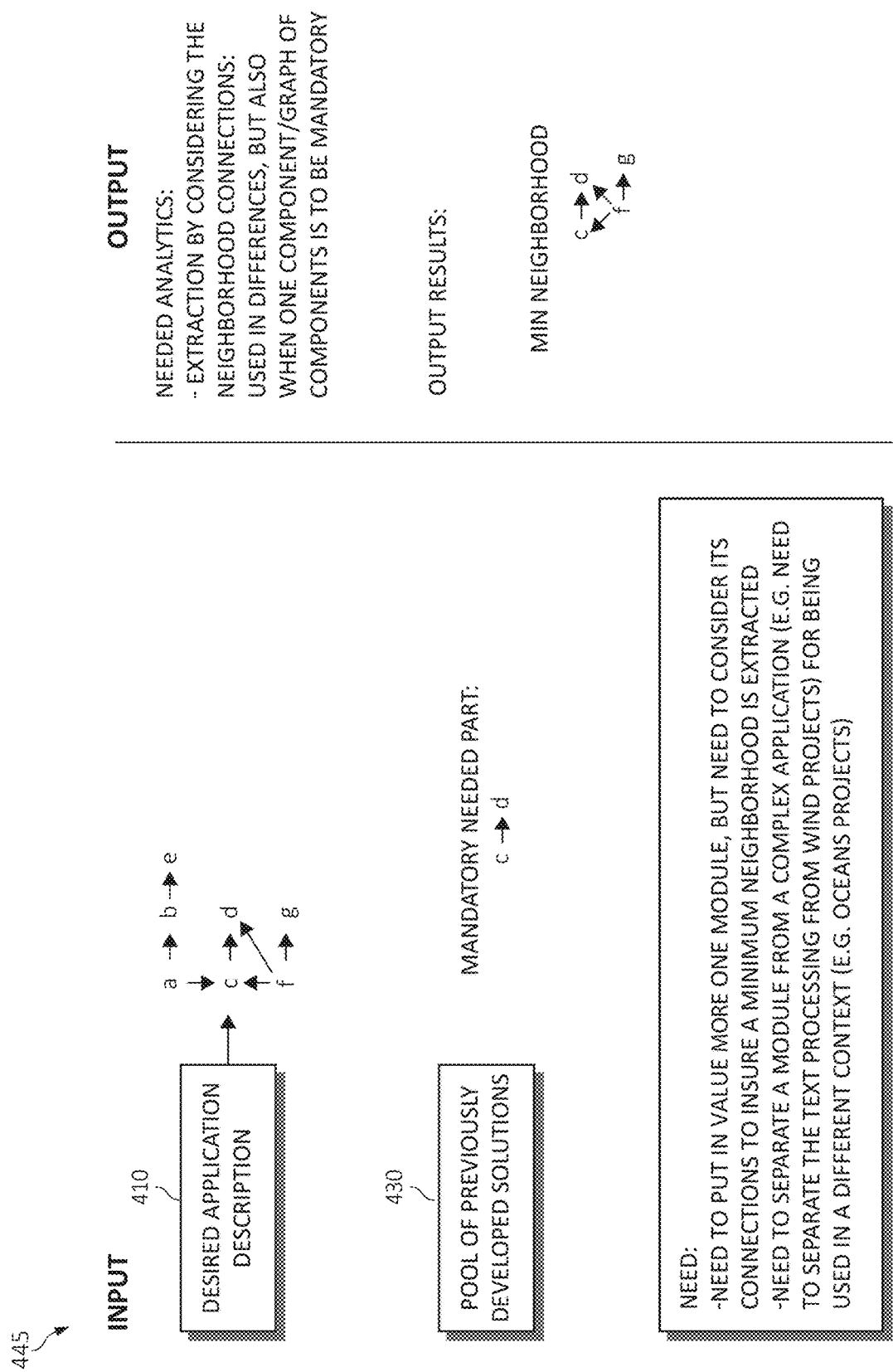
FIG. 4D is a block diagram depicting an operation for determining a minimum graph neighborhood according to various aspects of the present invention.

As depicted in FIG. 4D, an operation may be performed for determining a minimum graph neighborhood. As part of the determining operation, the operation may include putting in a value for one or more components while also considering the connections to insure a minimum neighborhood is extracted (for example a core component for computation of a mathematical score is highly important and is wanted to be extracted for later re-use, but this component computations are dependent on two other components ensuring preliminary operations used in the core components, like for example one component for input data processing and another computation for sampling the data). A component from a complex application (e.g. need to separate the text processing from wind projects) may need to be separated for being used in a different context (e.g. ocean projects).

As output, the determination operation may provide extraction by considering the neighborhood connections such as, for example, used in differences, but also when at least one component/graph of components is required to be used (e.g., components c to d are required). Thus, using the mandatory component of c to d, for example, the minimum neighborhood is c to d, f to c and d, and f to g. It should be noted that neighbors of a graph may be all the nodes of the graph connected by an edge of a specified node. A graph neighborhood in a graph is the set of all the vertices adjacent to vertex "v" including vertex "v" itself. More generally, the ith neighborhood of vertex "v" is a set of all vertices that lie at the distance "i" from vertex "v." A subgraph induced by the neighborhood of a graph from vertex "v" may be referred to as the neighborhood graph.

In one aspect, to determine a minimum graph neighborhood, a mandatory or required subgraph G may be used as input for the determination operation. The output or result of the determination operation may be minimum neighborhood G" that contains G' (which may be safely be removed from G so that no other connectivity constraints are violated), as further illustrated in the following pseudocode:

Let G"={G'} and let stop=false;
While (! stop) repeat;
C=G"
Let {a} be a component in G but not in G" such that there is a connection between G" and G through {a};
Add {a} to G";
If there exists a path from G" to any node in G but not in G" then stop=false, else stop=true.

As depicted in FIG. 4E, an operation may be performed for determining a composition of analytics for reusing components. As part of the determining operation, the operation may include using a chain of combination of analytics and estimating the sum total of costs for the chain of combination of analytics.

That is, a pool of analytics (e.g., a pool of 4) may be include determining the complex analytics combining the operations of: 1) determining common/similar graphs of components between either a desired application solution 410 (e.g., desired application description) and an existing application solution, and/or between the desired application solution and multiple existing application solution (e.g., a pool of previously developed solutions), 2) determining the top-k common components for targeting a future defined goal, 3) determining the difference between graphs of components for re-use purpose, and/or 4) determining the minimum graph neighborhood, as in block 465. An interactive graphical user interface ("GUI") (e.g., visual tool) may be provide of the composition of analytics applied on assets such as, for example, differences (d, e) applied to union of components (a, b, c) with a minimum neighborhood (f) having a total cost "C" and/or differences (d, e) applied to component a with a minimum neighborhood (f) having a total cost "C2."

Figure 5:
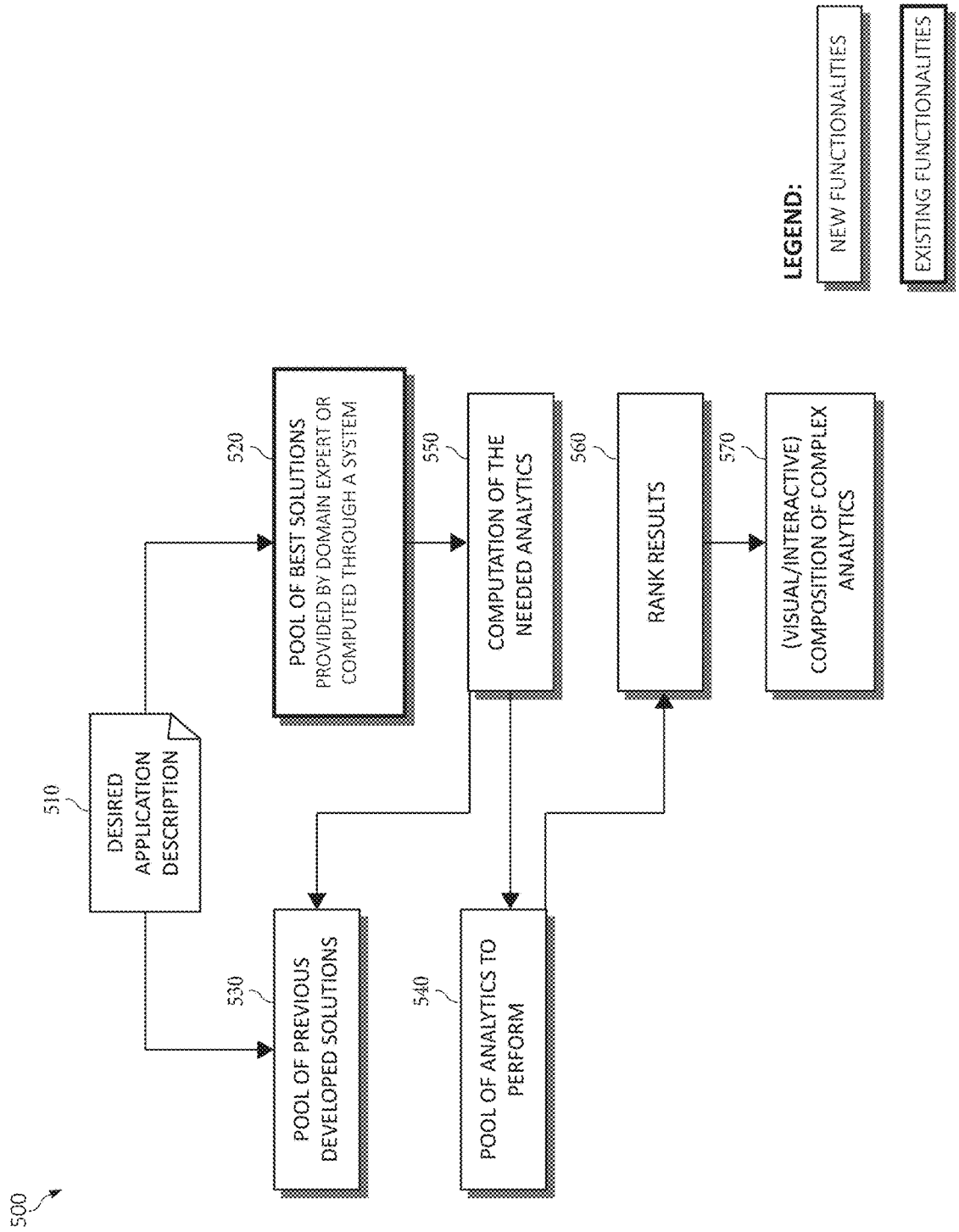
FIG. 5 is a block diagram depicting an operation for automated analytics for improving the reuse of application solutions for application providers according to various aspects of the present invention.

Turning now to FIG. 5, a block-flow diagram of exemplary functionality 500 relating to automated analytics for improving the reuse of application solutions for application providers is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4A-E. With the foregoing in mind, the module blocks 500 may also be incorporated into various hardware and software components of a system for automated and interactive training for application providers in accordance with the present invention. Many of the functional blocks 500 may execute as background processes on various components, either in distributed computing components, or on the user device, or elsewhere, and generally unaware to the user.

An application provider (e.g., a domain expert) may input a desired application description, as in block 510. A pool of previous existing solutions 530 (e.g., best or optimal solutions) may be accessed and provided by the application provider or computing system, as in block 520. In one aspect, the set of optimal/best solutions that are being compared to the desired application solution/description may be provided by: one or more domain experts, experienced consultants, machine learning operations, a computing system, an application provider, a pool computed especially as training set for educational purpose, and/or an external system.

The required/needed analytics may be determined, as in block 550. A pool of analytics 540 may be performed according to the required/needed analytics of block 550, as in block 540. A ranking operation (e.g., rank results) may be performed to rank the components and/or graph of components to be reused according set of analytics, as in block 560. A composition of complex analytics may be provided to an interactive GUI (e.g., visual/interactive mechanism), as in block 570.

Figure 6:
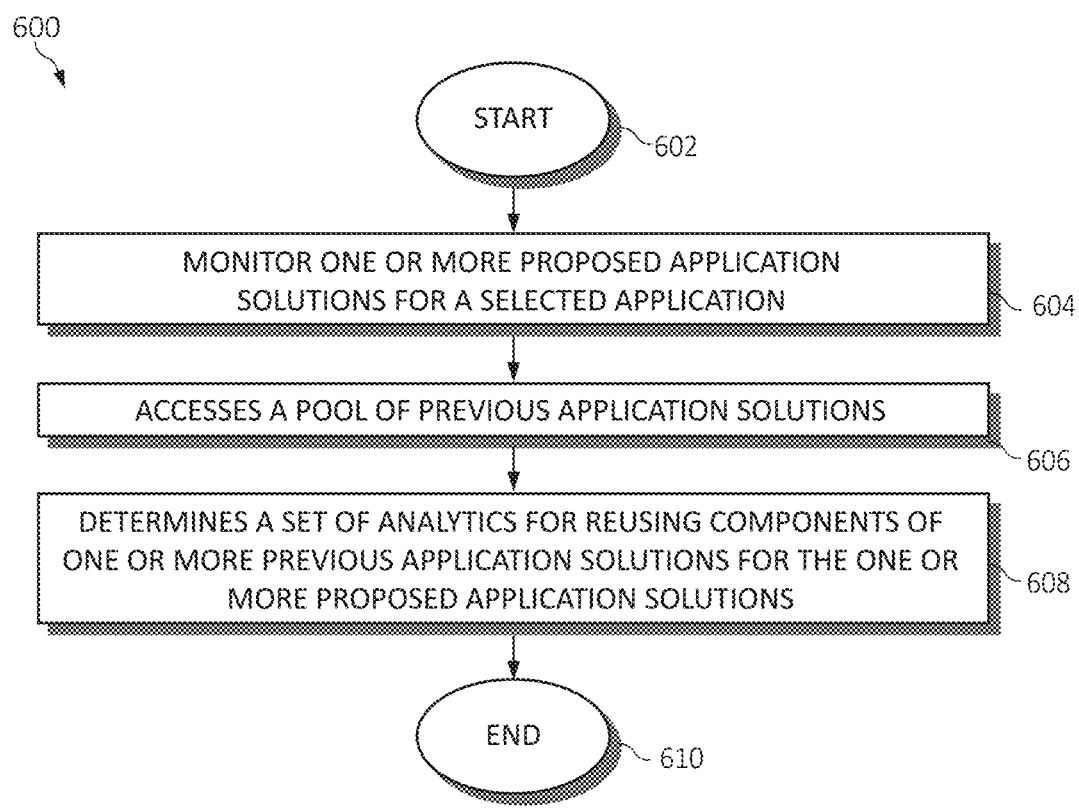
FIG. 6 is a flowchart diagram depicting an exemplary method for automated analytics for improving the reuse of application solutions for application providers by a processor, again in which aspects of the present invention may be realized.

Turning now to FIG. 6, a method 600 for automated analytics for improving the reuse of application solutions for application providers using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602. One or more proposed application solutions for a selected application may be monitored, as in block 604. A pool of previous application solutions may be accessed, as in block 606. A set of analytics may be determined for reusing components of one or more previous application solutions for the one or more proposed application solutions, as in block 608. The functionality 600 may end, as in block 610.

In one aspect, in conjunction with and/or as part of at least one block of FIG. 6, the operations of method 600 may include each of the following. The operations of method 600 may determine a similarity between the one or more proposed application solutions and the one or more of the previous application solutions.

The operations of method 600 may determines one or more similar graphs of components between the one or more of the previous application solutions and the one or more proposed application solutions, determines K number of ranked common graphs of components between the one or more of the previous application solutions and the one or more proposed application solutions, wherein K is a positive integer or defined value, determine one or more selected differences between graphs of components between the one or more of the previous application solutions and the one or more proposed application solutions, determines a minimum graphs neighborhood between the one or more of the previous application solutions and the one or more proposed application solutions, or a combination thereof. The operations of method 600 may rearrange one or more previous application solutions selected for the one or more.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for automated analytics for reuse of application solutions by an application provider by a processor, comprising:
   monitoring one or more proposed application solutions for a selected application, wherein the monitoring includes receiving, from a user, input of a desired project description and a desired component description for the selected application;
   accessing a pool of previous application solutions, wherein the desired project description and the desired component description are compared for similarity to project descriptions and component descriptions of the previous application solutions; and
   determining a set of analytics for reusing components of one or more previous application solutions for the one or more proposed application solutions according to the comparison, wherein determining the set of analytics includes:
identifying which of the components of the one or more previous application solutions are most optimally reused in the one or more proposed application solutions according to a commonality of the reused components to the desired component description and a cost benefit analysis of integrating the reused components of the one or more previous application solutions as compared to developing new components;
determining one or more similar graphs of the components between the one or more of the previous application solutions and the one or more proposed application solutions;
determining one or more selected differences between graphs of the components between the one or more of the previous application solutions and the one or more proposed application solutions; and
determining a minimum graphs neighborhood between the one or more of the previous application solutions and the one or more proposed application solutions.

2. The method of claim 1, further including determining a similarity between the one or more proposed application solutions and the one or more of the previous application solutions.

3. The method of claim 1, wherein determining the set of analytics further includes determining a number of ranked common graphs of components between the one or more of the previous application solutions and the one or more proposed application solutions.

4. The method of claim 1, further including rearranging one or more previous application solutions selected for the one or more proposed application solutions via an interactive graphical user interface ("GUI").

5. A system for reusing application solutions for an application provider, comprising:
one or more computers with executable instructions that when executed cause the system to:
monitor one or more proposed application solutions for a selected application, wherein the monitoring includes receiving, from a user, input of a desired project description and a desired component description for the selected application;
access a pool of previous application solutions, wherein the desired project description and the desired component description are compared for similarity to project descriptions and component descriptions of the previous application solutions; and
determine a set of analytics for reusing components of one or more previous application solutions for the one or more proposed application solutions according to the comparison, wherein determining the set of analytics includes:
identifying which of the components of the one or more previous application solutions are most optimally reused in the one or more proposed application solutions according to a commonality of the reused components to the desired component description and a cost benefit analysis of integrating the reused components of the one or more previous application solutions as compared to developing new components;
determining one or more similar graphs of the components between the one or more of the previous application solutions and the one or more proposed application solutions;
determining one or more selected differences between graphs of the components between the one or more of the previous application solutions and the one or more proposed application solutions; and
determining a minimum graphs neighborhood between the one or more of the previous application solutions and the one or more proposed application solutions.

6. The system of claim 5, wherein the executable instructions further determine a similarity between the one or more proposed application solutions and the one or more of the previous application solutions.

7. The system of claim 5, wherein, pursuant to determining the set of analytics the executable instructions further determine a number of ranked common graphs of components between the one or more of the previous application solutions and the one or more proposed application solutions.

8. The system of claim 5, wherein the executable instructions further rearrange one or more previous application solutions selected for the one or more proposed application solutions via an interactive graphical user interface ("GUI").

9. A computer program product for, by a processor, reusing application solutions for an application the computer program product comprising a non-transitory computer-readable storage medium having computer-readable program code portions stored therein, the computer-readable program code portions comprising:
an executable portion that monitors one or more proposed application solutions for a selected application, wherein the monitoring includes receiving, from a user, input of a desired project description and a desired component description for the selected application;
an executable portion that accesses a pool of previous application solutions, wherein the desired project description and the desired component description are compared for similarity to project descriptions and component descriptions of the previous application solutions; and
an executable portion that determines a set of analytics for reusing components of one or more previous application solutions for the one or more proposed application solutions according to the comparison, wherein determining the set of analytics includes:
identifying which of the components of the one or more previous application solutions are most optimally reused in the one or more proposed application solutions according to a commonality of the reused components to the desired component description and a cost benefit analysis of integrating the reused components of the one or more previous application solutions as compared to developing new components;
determining one or more similar graphs of the components between the one or more of the previous application solutions and the one or more proposed application solutions;
determining one or more selected differences between graphs of the components between the one or more of the previous application solutions and the one or more proposed application solutions; and
determining a minimum graphs neighborhood between the one or more of the previous application solutions and the one or more proposed application solutions.

10. The computer program product of claim 9, further including an executable portion that determines a similarity between the one or more proposed application solutions and the one or more of the previous application solutions.

11. The computer program product of claim 9, further including an executable portion that, pursuant to determining the set of analytics the executable instructions, further
  determine a number of ranked common graphs of components between the one or more of the previous application solutions and the one or more proposed application solutions.

12. The computer program product of claim 9, further including an executable portion that rearranges one or more previous application solutions selected for the one or more proposed application solutions via an interactive graphical user interface ("GUI").

* * * * *